US008749709B2

(12) United States Patent
Velasco (10) Patent No.: US 8,749,709 B2
(45) Date of Patent: Jun. 10, 2014

(54) VIDEO SOURCE CORRECTION (71) Applicant: Crestron Electronics, Inc., Rockleigh, NJ (US)

(72) Inventor: Adolfo Velasco, Saddle Brook, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 0 days.

(21) Appl. No.: 13/854,379

(22) Filed: Apr. 1, 2013

(65) Prior Publication Data

US 2013/0258193 A1    Oct. 3, 2013

Related U.S. Application Data (60) Provisional application No. 61/618,886, filed on Apr. 2, 2012.

(51) Int. Cl.
*H04N 5/46* (2006.01)
(52) U.S. Cl.
USPC ............................ 348/558; 348/530; 348/516
(58) Field of Classification Search
CPC ............. H04N 5/46; H04N 5/04; H04N 5/10; H04N 5/126; H04N 5/38; H04N 7/081; H04N 7/083; H04N 7/084; H04N 7/087; H04N 7/0806; H04N 7/0122; H04N 7/18; H04N 7/181; H04N 21/43635; H04N 21/4302; H04N 21/80; H04N 21/4423; H04N 21/43617; H04N 13/0029; H04N 13/0497
USPC ......... 348/558, 529–531, 516, 554–557, 540, 348/542, 547
IPC ......................................................... H04N 5/46
See application file for complete search history.

(56) References Cited

U.S. PATENT DOCUMENTS

| | | | | |
|---|---|---|---|---|
| 7,158,186 B2 * | 1/2007 | Selby et al. | .................... | 348/459 |
| 7,176,980 B2 * | 2/2007 | Stone et al. | .................... | 348/558 |
| 7,502,076 B2 * | 3/2009 | Xiu et al. | ........................ | 348/572 |
| 7,796,198 B2 * | 9/2010 | Ikeda et al. | .................... | 348/739 |
| 8,264,613 B2 * | 9/2012 | Harris et al. | ................... | 348/607 |

* cited by examiner

*Primary Examiner* — Trang U Tran
(74) *Attorney, Agent, or Firm* — Crestron Electronics Inc.

(57) ABSTRACT

An input card of video switcher includes a detection block for detecting errors in the timing signals of a digital video signal within a range. For timing signals with errors that fall within the range, the input card implements a correction block to correct the signals to an expected resolution. For timing signals with errors that fall out of the range, the input card does implement the correction block and passes the raw timing signal through.

17 Claims, 7 Drawing Sheets

VIDEO SOURCE CORRECTION

BACKGROUND OF THE INVENTION

1. Technical Field

The present invention relates to distributing video and more specifically to detecting and correcting stability issues with video timing signals received from a video source.

2. Background Art

Video distribution networks are increasingly common installations in commercial and residential facilities. Components of a video distribution network are typically located throughout the facility and networked allowing video to be distributed from one or more video source to one or more video sinks. For example, a typical video distribution network in a home may comprise a multitude of video sources, such as Blu-Ray Disc Players, media servers, digital video disc (DVD) players, Digital Video Recorders (DVR), and cable boxes. These video sources may be centrally located such as in an equipment rack in a closet and distributed via a chain of switches and repeaters to various video sinks, such as television displays, computer monitors and projectors, throughout the home.

Certain video sources, such as cable boxes distributed to customers from cable companies, may transmit digital video signals which are unstable or do not conform to standard digital video formats. Unstable video from a video source may not be displayed properly. Accordingly, there is a need for devices, systems and methods for detecting and correcting unstable video.

SUMMARY OF THE INVENTION

It is to be understood that both the general and detailed descriptions that follow are exemplary and explanatory only and are not restrictive of the invention.

DISCLOSURE OF INVENTION

Principles of the invention include devices, systems and methods for correcting a video signal received from a video source. According to a first aspect, the present invention provides a video receiver for receiving a digital video signal including a vertical synchronization signal, a horizontal synchronization signal and a data enable signal. The video receiver includes a detection block, a vertical synchronization correction block, a horizontal synchronization correction block and a data enable correction block. For a frame of received video, the detection block is configured for estimating an expected total horizontal pixels, an expected total vertical scan lines, an expected active horizontal pixels and an expected active vertical scan lines, measuring the actual horizontal pixels, the actual vertical scan lines, the measured active horizontal pixels and the measured active vertical scan lines, determining whether the magnitude of the difference between the expected total vertical scan lines and the measured total vertical scan lines falls within a first range defined by a first threshold and a second threshold, determining whether the magnitude of the difference between the expected total horizontal pixels and the measured total horizontal pixels falls within a second range defined by a third threshold and a fourth threshold, determining whether the magnitude of the difference between the expected active horizontal pixels and the measured active horizontal pixels falls within a third range defined by a fifth threshold and a sixth threshold, and determining whether the magnitude of the difference between the expected active vertical scan lines and measured active vertical scan lines falls within a fourth range defined by a seventh threshold and an eighth threshold. The vertical synchronization correction block is configured for correcting the vertical synchronization signal if the magnitude of the difference between the expected total vertical scan lines and the measured total vertical scan lines is not within the first range. The horizontal synchronization correction block is configured for correcting the horizontal synchronization signal if the magnitude of the difference between the expected total horizontal pixels and the actual horizontal pixels is not within the second range. The data enable correction block configured for correcting the data enable signal if the magnitude of the difference between the expected active vertical scan lines and the measured active vertical scan lines is not within the third range and the magnitude of the difference between the expected active horizontal pixels and the measured active horizontal pixels is not within the fourth range.

According to a second aspect, the present invention provides a method for correcting a video signal. The method comprises the steps of: receiving a video signal comprising a horizontal synchronization signal, a vertical synchronization signal, and a data enable signal; estimating an expected total vertical scan lines, an expected total horizontal pixels, an expected active vertical scan lines and an expected active horizontal pixels; measuring a measured total vertical scan lines, a measured total horizontal pixels, a measured active vertical scan lines and an measured active horizontal pixels; determining whether the magnitude of the difference between the expected total vertical scan lines and the measured total vertical scan lines falls within a first range defined by a first threshold and a second threshold; correcting the vertical synchronization signal according to the expected total vertical scan lines if the magnitude of the difference between the expected total vertical scan lines and the measured total vertical scan lines is not within the first range; determining whether the magnitude of the difference between the expected total horizontal pixels and the measured total horizontal pixels falls within a second range defined by a third threshold and a fourth threshold; correcting the horizontal synchronization signal according to the expected total horizontal pixels if the magnitude of the difference between the expected total horizontal pixels and the actual horizontal pixels is not within the second range; determining whether the magnitude of the difference between the expected active horizontal pixels and the measured active horizontal pixels falls within a third range defined by a fifth threshold and a sixth threshold; determining whether the magnitude of the difference between the expected active vertical scan lines and measured active vertical scan lines falls within a fourth range defined by a seventh threshold and an eighth threshold; correcting the data enable signal if the magnitude of the difference between the expected active vertical scan lines and the measured active vertical scan lines is not within the third range and the magnitude of the difference between the expected active horizontal pixels and the measured active horizontal pixels is not within the fourth range.

BRIEF DESCRIPTION OF DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

BRIEF DESCRIPTION OF THE SEVERAL VIEWS OF THE DRAWING

LIST OF REFERENCE NUMBERS FOR THE MAJOR ELEMENTS IN THE DRAWING

The following is a list of the major elements in the drawings in numerical order.

10 video distribution network
11 video source (collectively the video sources of 11a-11n)
12 video switcher
13 video sink (collectively the video sinks of 13a-13n)
14 repeater
21 video frame
31 input video signal
33 detection block
34 video correction block
35 vertical synchronization correction block
36 horizontal synchronization correction block
37 DE correction block
38 output video signal
121 input card (collectively the input cards of 121a-n)
122 output card (collectively the output cards of 122a-n)
123 switch
211 horizontal front porch
212 horizontal back porch
213 vertical front porch
214 vertical back porch
215 active region
311 raw vertical synchronization signal
312 raw horizontal synchronization signal
313 raw data enable signal
314 clock signal
315 first data channel
316 second data channel
317 third data channel
331 Vte output
332 Hte output
333 Vae output
334 Hae output
335 first enable signal
336 second enable signal
337 third enable signal
381 output vertical synchronization signal
382 output horizontal synchronization signal
383 output data enable signal
601 (step of) receiving video signal
602 (step of) waiting for video to stabilize
603 (step of) measuring Vtm
604 (step of) measuring Htm
605 (step of) measuring Vam
606 (step of) measuring Ham
607 (step of) estimating resolution by determining Vte, Hte, Vae, Hae
608 (step of) applying V synchronization correct
609 (step of) outputting V synchronization signal
610 (step of) applying H synchronization correct
611 (step of) outputting H synchronization signal
612 (step of) applying DE correct
613 (step of) outputting DE signal
701 (step of) generating first enable signal
702 (step of) generating second enable signal
703 (step of) generating third enable signal

DETAILED DESCRIPTION OF THE INVENTION

The inventive concept seeks to solve the problem of unstable video by detecting and correcting problematic video sources.

Figure 1:
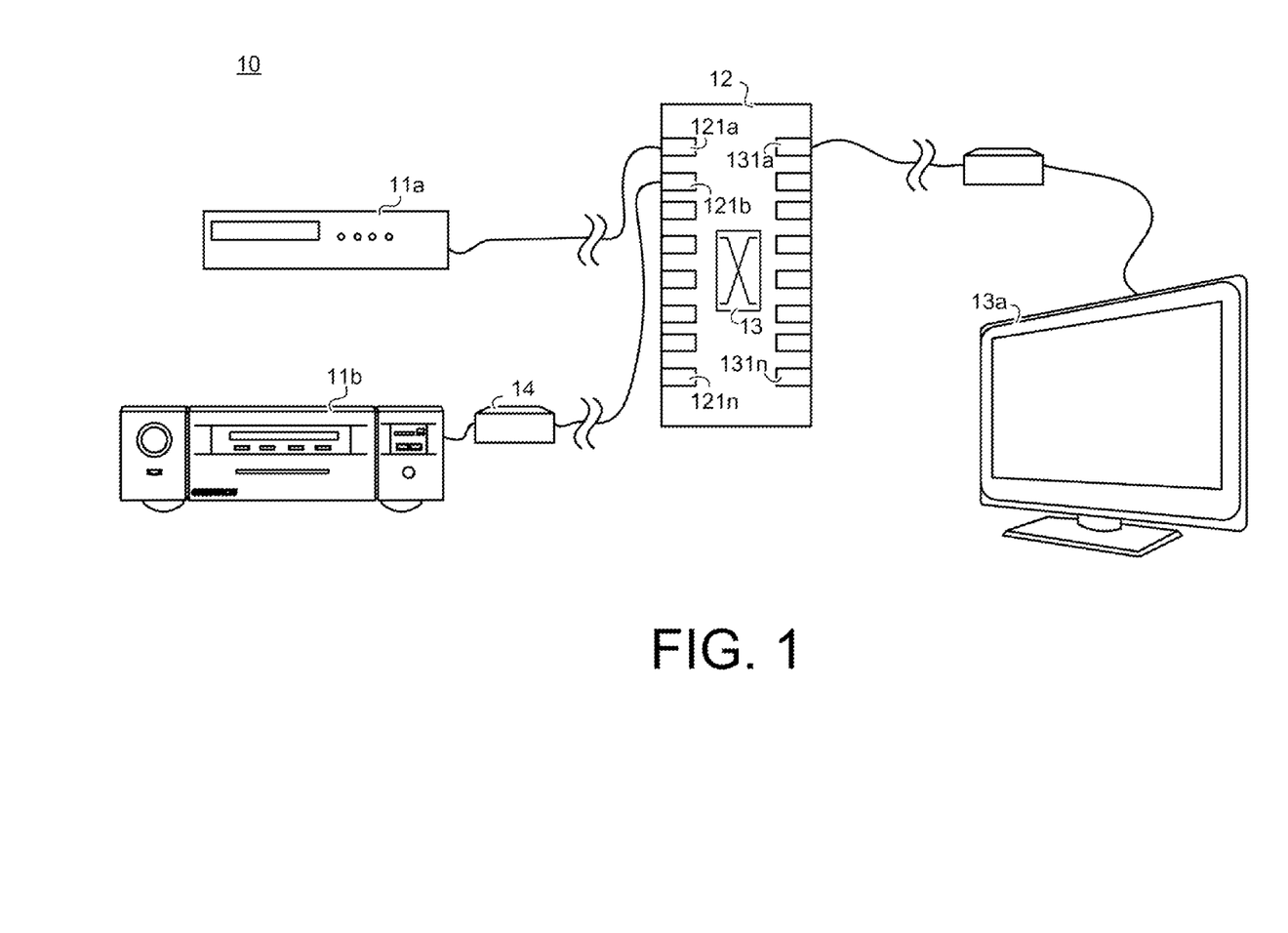
FIG. 1 is a block diagram of a video distribution network in accordance with an illustrative embodiment of the invention.

FIG. 1 is a block diagram of a video distribution network in accordance with an illustrative embodiment of the invention. The video distribution network 10 comprises one or more video sources 11, a video switcher 12 and one or more video sinks 13. The video distribution network 10 also comprises one or more intermediate components such as a repeater 14 and a network gateway (not shown). The one or move video sources 11 may comprise a digital video disc (DVD) player, a cable box, a satellite tuner, a Blu-ray disc player, a media server or any other device for generating, processing or transmitting video signals. The one or more video sinks 13 may comprise a television, a computer display, a projector or any other device for displaying video signals. The video switcher 12 further comprises one or more video receivers, such as one or more input cards 121 for receiving video from a video source, one or more video transmitters, such as one or more output cards 122 for transmitting video to the video sinks and a switch 123, such as a matrix switch or a multiplexer for routing video from a desired video source 11 to a desired video sink 13.

One or more input cards of the video switcher may be configured for receiving digital video from a digital video source. For example, the input card may comprise a High Definition Media Interface (HDMI) port for receiving an HDMI cable from a digital video source, thereby forming an HDMI interface between the input card and the digital video source.

Figure 2:
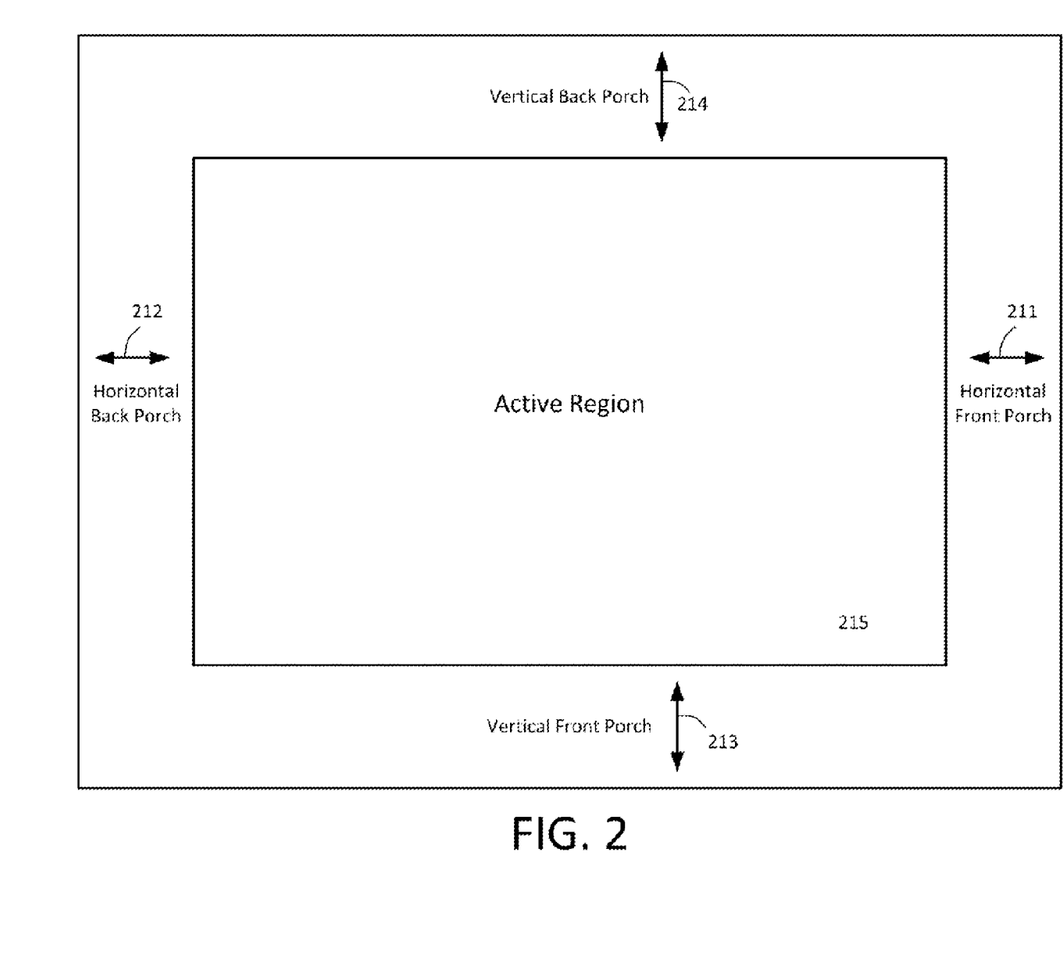
FIG. 2 is a depiction of a frame of digital video in accordance with an illustrative embodiment of the invention.

FIG. 2 is a depiction of a frame of digital video in accordance with an illustrative embodiment of the invention. Digital video is composed of a stream of individual frames of video 21. Each video frame 21 comprises five regions: the horizontal front porch (HFP) 211, the horizontal back porch (HBP) 212, the vertical front porch (VFP) 213, the vertical back porch (VBP) 214 and the active region (AR) 215. Digital video is typically transmitted in standard formats which define the dimensions of each of these regions.

The active region 215 of the frame comprises the video data to be displayed. The active region 215 is defined by its height in active vertical (Va) pixels and its width in active horizontal (Ha) pixels. These two dimensions are what is commonly known as the resolution of a video. For example, video with 1080p resolution corresponds to progressively scanned video for which each frame comprises an active region 215 having a height of one thousand and eighty (1,080) scan lines and a width of one thousand nine hundred and twenty (1,920) pixels.

Each frame comprises additional horizontal pixels and vertical scan lines not displayed. The vertical front porch 213 comprises blanking lines transmitted prior to the vertical sync. The vertical back porch 214 comprises the blanking lines transmitted subsequent to the vertical sync. The horizontal front porch 211 comprises blanking pixels transmitted before horizontal sync. The horizontal back porch 212 comprises blanking pixels transmitted after horizontal sync.

The total horizontal pixels (Ht) in each line comprises the horizontal pixels of the horizontal front porch 211, the active region 215 (Ha) and the horizontal back porch 212. The total vertical scan lines (Vt) of each frame comprises the scan lines of the vertical front porch 213, active region 215 (Va) and the vertical back porch 214. The horizontal blanking region is equal to Ha subtracted from Ht. The vertical blanking region is equal to Va subtracted from Vt.

The frames of digital video and the corresponding regions are defined by the signals of the digital video. A digital video signal typically comprises seven signals: a clock signal, a horizontal synchronization signal, a vertical synchronization signal, three data channels and a data enable (DE) signal. The horizontal synchronization signal determines the horizontal dimensions of each frame of digital video or the number of samples. The vertical synchronization signal determines the vertical dimensions of the frame or the number of horizontal scan lines. The DE signal determines the active region of each frame. The three data channels provide the visual data for the frame and may consist of a red data channel, a green data channel and a blue data channel. The clock signal, horizontal synchronization signal, vertical synchronization signal and the DE signal are collectively referred to as the timing signals.

When a video source is not stable, it is difficult for an input card of a video switcher to determine the resolution variables (Ha, Ht, Va, Vt). The video signal may have synchronization problems as determined from one or more of the following variables not stabilizing: total horizontal pixels (Ht), total vertical scan lines (Vt), active horizontal pixels (Ha) and active vertical scan lines (Va).

Figure 3:
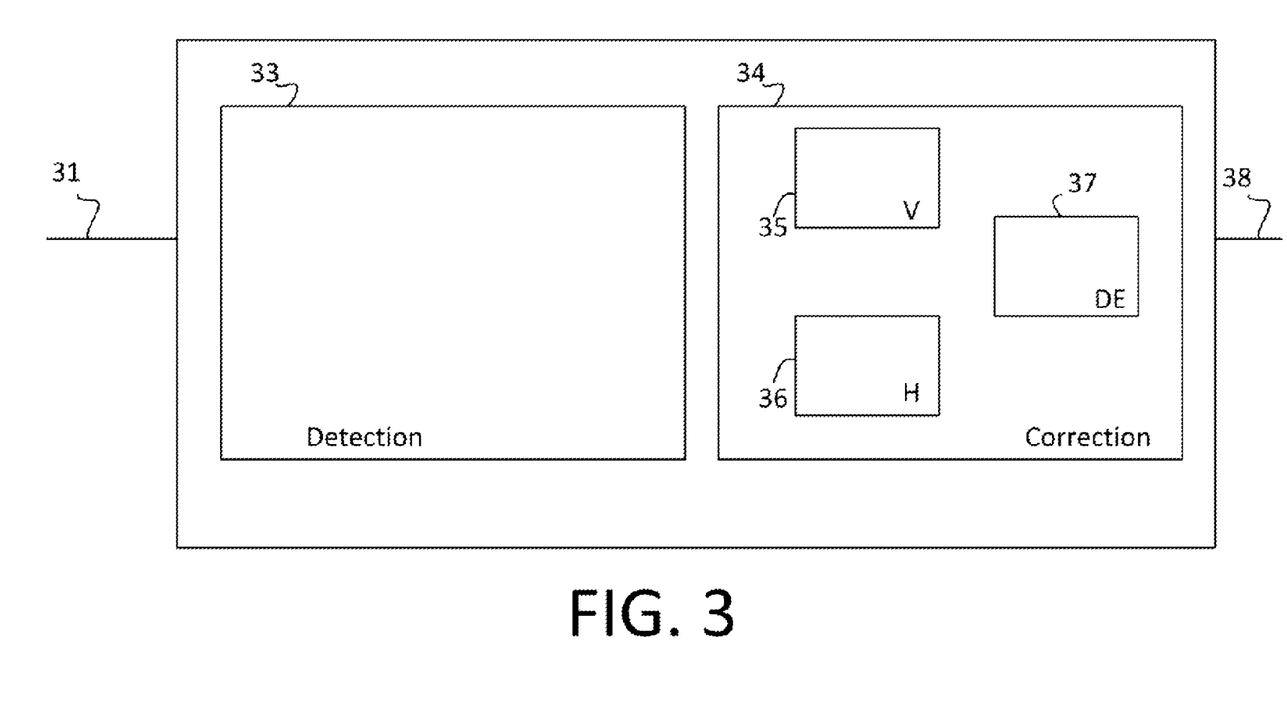
FIG. 3 is a block diagram of an input card of a video switcher, according to an illustrative embodiment of the invention.

Accordingly, the present invention provides an input card configured to detect and correct errors in one or more of the timing signals of a video signal. FIG. 3 is a block diagram of an input card of a video switcher, according to an illustrative embodiment of the invention. The video receiver, such as an input card 121 comprises a detection block 33 and a video correction block 34.

The input card 121 is configured for receiving a digital video signal 31 comprising a raw vertical synchronization signal 311, a raw horizontal synchronization signal 312, a raw data enable signal 313, a clock signal 314 and one or more data channels such as a red data channel 315, a green data channel 316 and a blue data channel 317. The input card 121 is further configured for estimating the resolution of the video signal and corresponding timing variables. For each timing variable (Vt, Ht, Va, Ha), if the difference between the expected value and the measured value is greater than a predetermined threshold, the input card 121 may implement a video correction block 34.

However, the inventors have discovered that certain video sources transmit digital video that does not conform to standard video formats but are nonetheless stable. It is preferable to pass these signals through rather than applying the video correction block 34. Accordingly, for each timing variable, if the difference between the expected value and the measured value is less than a second predetermined threshold, the video signal is passed through untouched.

Each timing variable may have a range defined by distinct thresholds or each may have the same range defined by the same thresholds. These thresholds are predetermined. They may be predetermined experimentally. In an embodiment of the invention, one or more thresholds may be input by a user or technician via a user interface of the input card or video switcher. In another embodiment of the invention, they may be programmed initially by a manufacturer of the device or technician. In yet another embodiment, the input card may set the thresholds according to the video source type, such as by the manufacturer, model name, or serial number of the video source type. For example, the input card may determine the EDID value of the video source and set the threshold values from a lookup table, according to the EDID value.

Figure 4:
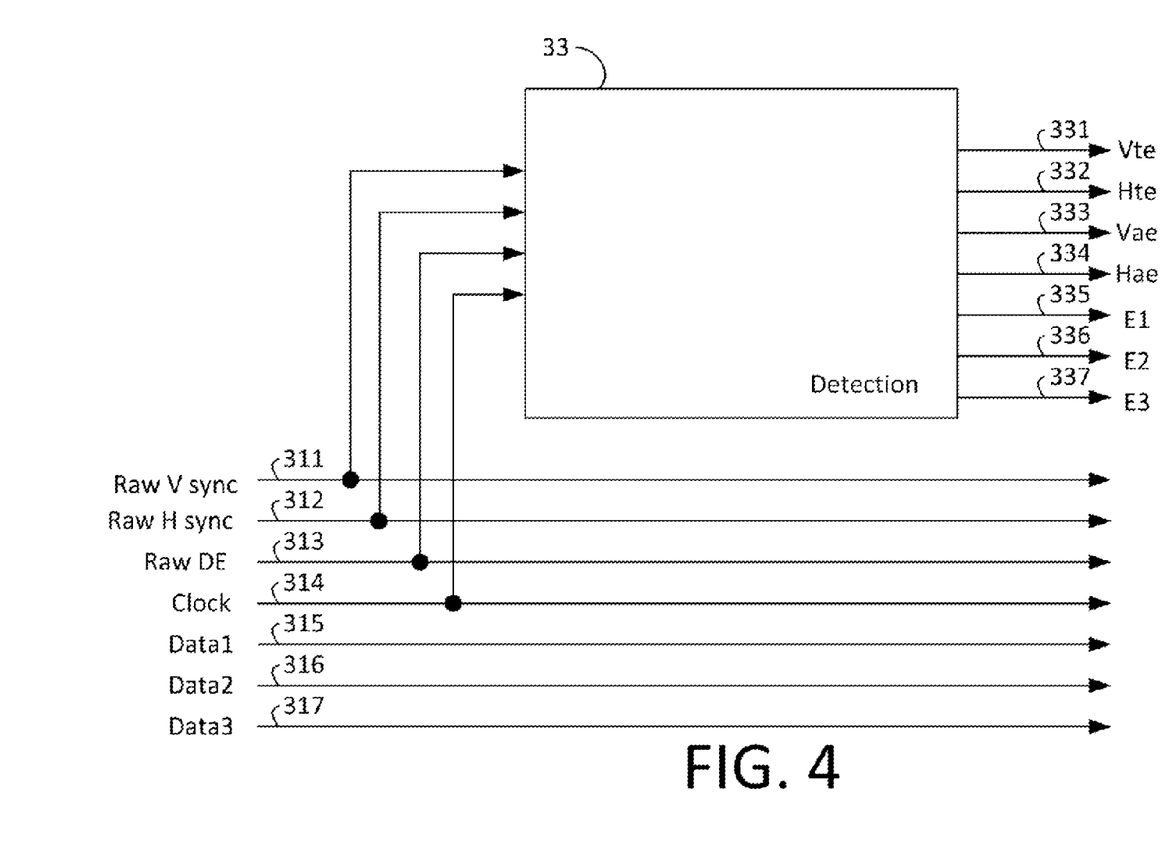
FIG. 4 is a block diagram of a detection block of an input card according to an illustrative embodiment of the invention.

FIG. 4 is a block diagram of a detection block of an input card 121 according to an illustrative embodiment of the invention.

The detection block 33 is configured for receiving the raw timing signals of the video signal. From the raw timing signals, the detection block 33 measures the total vertical scan lines (Vtm), the total horizontal pixels (Htm), the active vertical scan lines (Vam) and the active horizontal pixels (Ham) upon the timing signals reaching a steady state.

The detection block is configured for guessing the resolution of the video signal from the measured values by estimating a value for the total vertical scan lines (Vte), total horizontal pixels (Hte), active vertical scan lines (Vae) and active horizontal pixels (Hae). The detection block 33 is further configured for outputting the expected values (Vte, Hte, Vae, Hae). In one embodiment, the detection block 33 outputs the expected values as data values on one or more data signals. The correction block may output an expected total vertical scan lines value 331, an expected total horizontal pixels value 332, an expected active vertical scan lines value, 333, and an expected active horizontal pixels value 334.

The detection block 33 is further configured for comparing the measured variables to the expected values and determining which timing signals should be corrected and which should be passed through without correction processing.

The detection block 33 is configured for generating a first enable signal 335 dependent on the comparison between the measured total vertical scan lines (Vtm) and the expected total vertical scan lines (Vte). The first enable signal 335 is in a first logic state if the magnitude of the difference between the expected total vertical scan lines (Vte) and the measured total vertical scan lines (Vtm) is not within a first range defined by a first threshold and a second threshold. The second enable 335 signal is in a second logic state if the magnitude of the difference between the expected total vertical scan lines (Vte) and the measured total vertical scan lines (Vtm) is within the first range defined by the first threshold and the second threshold.

The detection block 33 is further configured for generating a second enable signal 336 dependent on the comparison between the measured total horizontal pixels (Htm) and the expected total horizontal pixels (Hte). The second enable signal 336 is in a first logic state if the magnitude of the difference between the expected total horizontal pixels (Hte) and the measured total horizontal pixels (Htm) is not within a second range defined by a third threshold and a fourth threshold. The second enable signal 336 is in a second logic state if the magnitude of the difference between the expected total horizontal pixels (Hte) and the measured total horizontal pixels (Htm) is within the second range defined by the third threshold and the fourth threshold.

The detection block 33 is further configured for generating a third enable signal 337 dependent on the comparison between the measured active vertical scan lines (Vam) and the expected active vertical scan lines (Vae) and the comparison between the measured active horizontal pixels (Ham) and the expected active horizontal pixels (Hae). The third enable signal 337 is in a first logic state when the magnitude of the difference between the expected active vertical scan lines (Vae) and the measured active vertical scan lines (Vam) is not within the third range defined by a fifth threshold and a sixth threshold and the magnitude of the difference between the expected active horizontal pixels (Hae) and the measured active horizontal pixels (Ham) is not within the fourth range defined by a seventh threshold and an eighth threshold.

Figure 5:
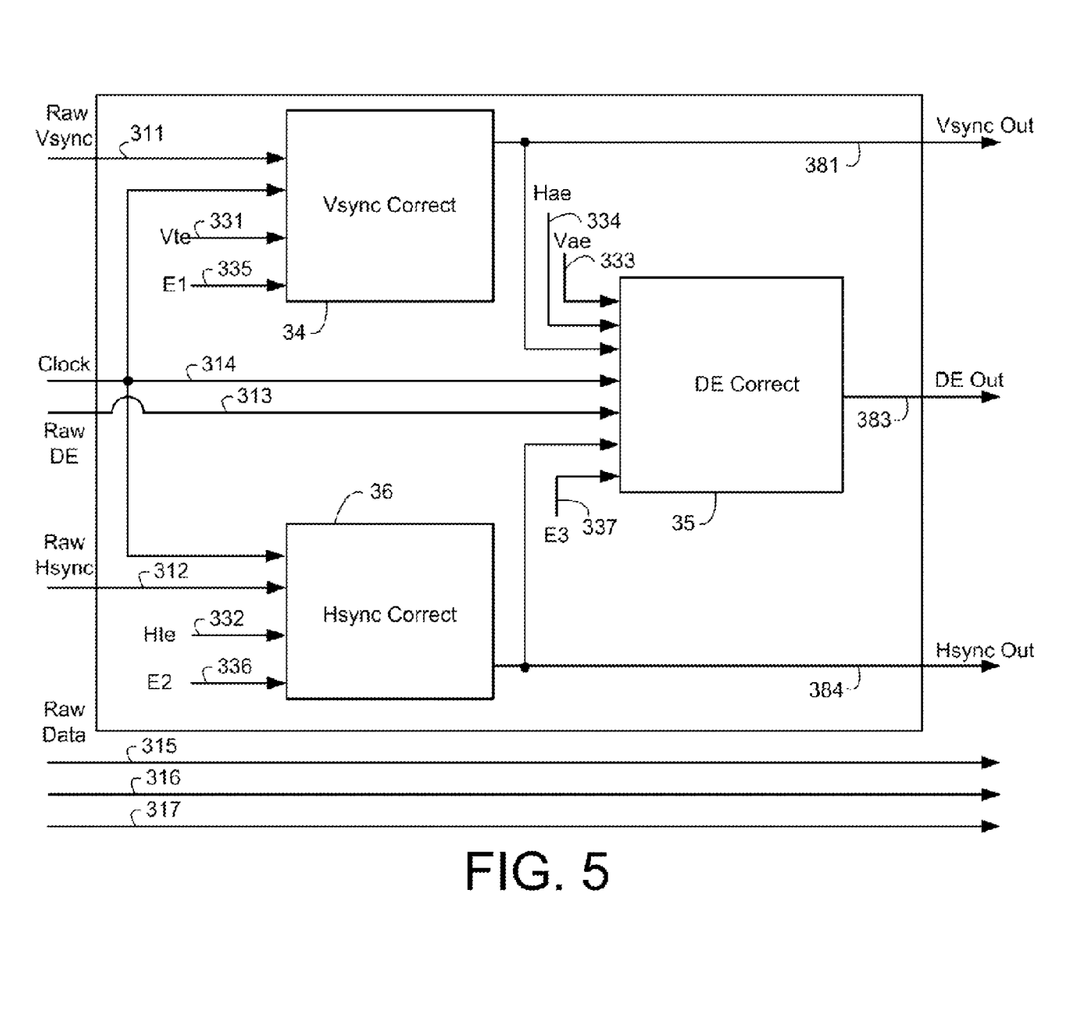
FIG. 5 is a block diagram of a correction block of an input card according to an illustrative embodiment of the invention.

FIG. 5 is a block diagram of a video correction block of an input card according to an illustrative embodiment of the invention. The video correction block 34 comprises a vertical synchronization correction block 35, a horizontal synchronization correction block 36 and a data enable correction block 37.

The vertical synchronization correction block 35 receives the raw vertical synchronization signal 311, the first enable signal 335 and the expected total vertical scan lines value 331 and transmits an output vertical synchronization signal 381. The output vertical synchronization signal 381 may be the raw vertical synchronization signal 311 or a corrected vertical synchronization signal. When the first enable signal 335 is in a second logic state (i.e. the magnitude of the difference falls within the first range), the vertical synchronization correction block 35 outputs a corrected vertical synchronization signal based on the expected vertical scan lines value 331. When the first enable signal 335 is in a first logic state (i.e. the magnitude of the difference does not fall within the first range), the vertical synchronization correction block 35 passes through the raw vertical synchronization signal 311.

The horizontal synchronization correction block 36 receives the raw horizontal synchronization signal 312, the second enable signal 336 and the expected total horizontal pixel value 332 and transmits an output horizontal synchronization signal 382. The output horizontal synchronization signal 382 may be the raw horizontal synchronization signal 312 or a corrected horizontal synchronization signal. When the second enable signal 336 is in a second logic state (i.e. the magnitude of the difference falls within the second range), the horizontal synchronization correction block 36 outputs a corrected horizontal synchronization signal based on the expected horizontal pixel value 332. When the second enable signal 336 is in a first logic state (i.e. the magnitude of the difference does not fall within the second range), the horizontal synchronization correction block 36 passes through the raw horizontal synchronization signal 312.

The data enable correction block 37 receives the raw data enable signal 313, the third enable signal 337, the expected active vertical scan line value 333 and the expected active horizontal pixel value 334 and transmits an output data enable signal 383. The output data enable signal 383 may be the raw data enable signal 313 or a corrected data enable signal. When the third enable signal 337 is in a second logic state (i.e. the magnitudes of the differences fall within the third and fourth range, respectively), the data enable correction block 37 outputs a corrected data enable signal based on the expected active vertical scan line value 333 and the expected active horizontal pixel value 334. When the third enable signal 337 is in a first logic state (i.e. the magnitudes of the differences do not fall within the third and fourth ranges, respectively), the data enable correction block 37 outputs the raw data enable signal 313.

In one implementation of the current concept, the detection block, the horizontal synchronization correction block, vertical synchronization correction block and DE correction block 37 are implemented as one or more field programmable gate arrays (FPGA) of the input card 121. For example, all four blocks may be implemented as a single FPGA. In another example, each correction block is implemented as a unique FPGA. Alternatively, the correction blocks may be implemented as one or more application specific integrated circuit (ASIC), microprocessor or other processing unit.

Advantageously, the data channels are not altered to detect and correct the video source. Accordingly, there is no associated image degradation due to video processing. Additionally, because there is no video processing, large buffers are not required and there are no associated latencies.

Figure 6:
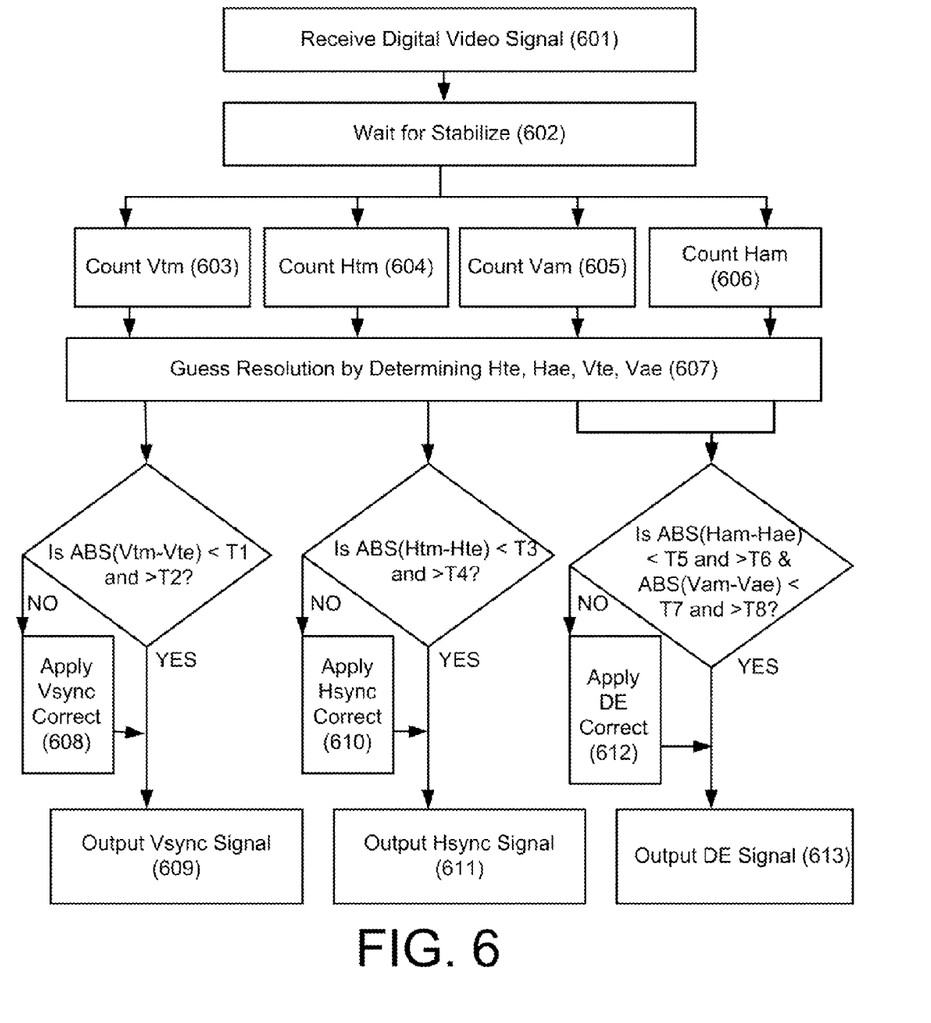
FIG. 6 is flowchart illustrating a method for detecting and correcting stability issues with video timing signals received from a video source according to an illustrative embodiment of the invention.

FIG. 6 is flowchart illustrating a method for detecting and correcting stability issues with video timing signals received from a video source, according to an illustrative embodiment of the invention. In step 601, the input card 121 receives a digital video signal from a digital video source. The digital video signal is comprised of a clock, a raw horizontal synchronization signal, a raw vertical synchronization signal, a raw DE signal and three data channels.

In step 602, the detection block 33 waits until the timing signals have stabilized to a steady state to allow a guess at the resolution.

In step 603, the detection block 33 measures the total vertical scan lines (Vtm).

In step 604, the detection block 33 measures the total horizontal pixels (Htm).

In step 605, the detection block 33 measures the active vertical scan lines (Vam).

In step 606, the detection block 33 measures the active horizontal pixels (Ham).

A guess is made of the video resolution in step 607. By guessing the video resolution, the detection block 33 determines a value for expected total horizontal pixels (Hte), expected total vertical scan lines (Vte), expected active horizontal pixels (Vae), and expected active vertical scan lines (Vae).

The detection block 33 determines the difference between the expected total vertical scan lines (Vte) and the measured total vertical scan lines (Vtm). In step 608, if the absolute value of the difference is greater than a first threshold T1 but less than a second threshold T2, the vertical synchronization signal is corrected by the vertical synchronization correction block 35.

In step 609, an output vertical synchronization signal 381 is output. If the absolute value of the difference is greater than a first threshold T1 but less than a second threshold T2, the corrected vertical synchronization signal is output. If the absolute value of the difference is less than a first threshold or greater than a second threshold, the raw horizontal synchronization signal is passed through unchanged.

The detection block 33 determines the difference between the expected total horizontal pixels (Hte) and the measured total horizontal pixels (Htm). In step 610, if the absolute value of the difference is greater than a third threshold T3 but less than a fourth threshold T4, the horizontal synchronization signal is corrected by the horizontal synchronization correction block 36.

In step 611, an output horizontal synchronization signal 382 is output. If the absolute value of the difference is greater than a third threshold T3 but less than a fourth threshold T4, the corrected horizontal synchronization signal is output. If the absolute value of the difference is less than a third threshold or greater than a fourth threshold, the raw horizontal synchronization signal is passed through unchanged.

The detection block 33 determines the difference between the expected active vertical scan lines (Vae) and the measured active vertical scan lines (Vam). Additionally, the detection block 33 determines the difference between the expected active horizontal pixels (Hae) and the measured active horizontal scan lines (Ham). In step 612, if the absolute value of the difference between the expected (Vae) and measured active vertical scan lines (Vam) is greater than a fifth threshold T5 but less than a sixth threshold T6 and if the absolute value of the difference between the expected (Hae) and measured active horizontal pixels (Ham) is greater than a seventh threshold T7 but less than an eighth threshold T8, the data enable signal is corrected by the data enable correction block 37.

In step 613, an output data enable signal 383 is output. if the absolute value of the difference between the expected and measured active vertical scan lines (Vam) is greater than a fifth threshold T5 but less than a sixth threshold T6 and if the absolute value of the difference between the expected (Hae) and measured active horizontal pixels (Ham) is greater than a seventh threshold T7 but less than an eighth threshold T8, the corrected data enable signal is output. if the absolute value of the difference between the expected (Vae) and measured active vertical scan lines (Vam) is less than a fifth threshold T5 or greater than a sixth threshold T6 or if the absolute value of the difference between the expected (Hae) and measured active horizontal pixels (Ham) is less than a seventh threshold T7 or greater than an eighth threshold T8, the raw data enable signal 313 is passed through unchanged.

Figure 7:
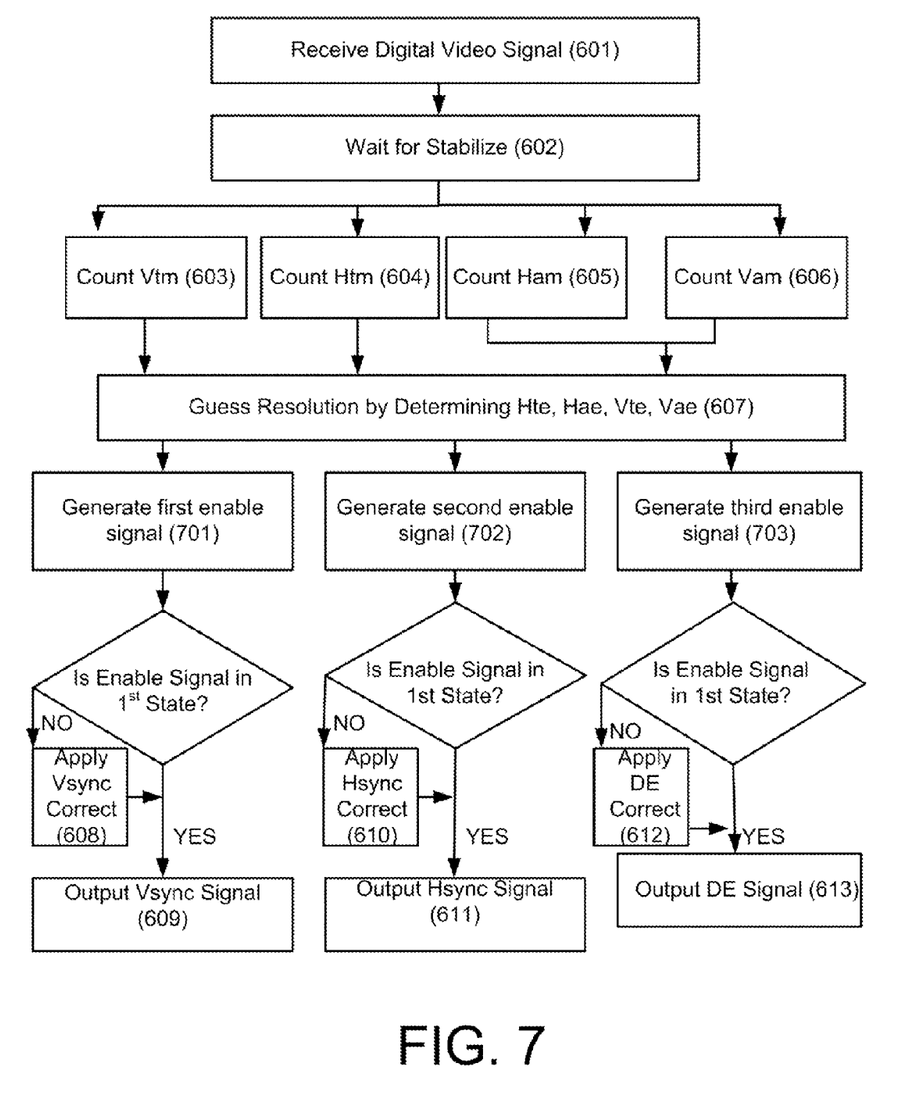
FIG. 7 is flowchart illustrating a method for detecting and correcting stability issues with video timing signals received from a video source according to an illustrative embodiment of the invention.

FIG. 7 is flowchart illustrating a method for detecting and correcting stability issues with video timing signals received from a video source, according to an illustrative embodiment of the invention. In this embodiment a first enable signal 335, second enable signal 336 and third enable signal 337 are generated in response to the determination of the differences.

In step 701, a first enable signal 335 is generated by the detection block 33. The first enable signal 335 is in a first logic state if the magnitude of the difference between the expected total vertical scan lines (Vte) and the measured total vertical scan lines (Vtm) is not within a first range defined by a first threshold and a second threshold. The second enable 335 signal is in a second logic state if the magnitude of the difference between the expected total vertical scan lines (Vte) and the measured total vertical scan lines (Vtm) is within the first range defined by the first threshold and the second threshold.

In step 608, if the first enable signal 335 is in the second logic state, the vertical synchronization signal is corrected by the vertical synchronization correction block 35. In step 609, if the first enable signal 335 is in the first logic state, the raw vertical synchronization signal 311 is passed through.

In step 702, a second enable signal 336 is generated by the detection block 33. The second enable signal 336 is in a first logic state if the magnitude of the difference between the expected total horizontal pixels (Hte) and the measured total horizontal pixels (Htm) is not within a second range defined by a third threshold and a fourth threshold. The second enable signal 336 is in a second logic state if the magnitude of the difference between the expected total horizontal pixels (Hte) and the measured total horizontal pixels (Htm) is within the second range defined by the third threshold and the fourth threshold.

In step 610, if the second enable signal 336 is in the second logic state, the horizontal synchronization signal is corrected by the horizontal synchronization correction block 36. In step 611, if the second enable signal 336 is in the first logic state, the raw horizontal synchronization signal 312 is passed through.

In step 703, a third enable signal 337 is generated by the detection block 33. The third enable signal 337 is in a first logic state when the magnitude of the difference between the expected active vertical scan lines and the measured active vertical scan lines (Vam) is not within the third range defined by a fifth threshold and a sixth threshold and the magnitude of the difference between the expected active horizontal pixels and the measured active horizontal pixels (Ham) is not within the fourth range defined by a seventh threshold and an eighth threshold.

In step 612, if the third enable signal 337 is in the second logic state, the data enable signal is corrected by the data enable correction block 37. In step 613, if the third enable signal 337 is in the first logic state, the raw data enable signal 313 is passed through.

INDUSTRIAL APPLICABILITY

To solve the aforementioned problems, the present invention is a unique device which receives digital video, detects and corrects unstable video.

LIST OF ACRONYMS USED IN THE DETAILED DESCRIPTION OF THE INVENTION

The following is a list of the acronyms used in the specification in alphabetical order.
ASIC application specific integrated circuit
DE data enable
DVD digital video disc
FPGA field programmable gate array
HDMI high-definition multimedia interface
Ha active horizontal pixels
Hae expected active horizontal pixels
Ham measured active horizontal pixels
Ht total horizontal pixels
Hte expected total horizontal pixels
Htm measured total horizontal pixels
AR active region
HBP horizontal back porch
HFP horizontal front porch
VBP vertical back porch
VFP vertical front porch
Sync synchronization
Va active vertical scan lines
Vt total vertical scan lines
Vae expected active vertical scan lines
Vam measured active vertical scan lines
Vte expected total vertical scan lines
Vtm measured total vertical scan lines Alternate embodiments may be devised without departing from the spirit or the scope of the invention. In one embodiment, the range may be defined as including the endpoint threshold values. In another embodiment, the range may be defined as not including the endpoint threshold values.

What is claimed is:

1. A video receiver configured for receiving a digital video signal comprising a vertical synchronization signal, a horizontal synchronization signal and a data enable signal and comprising:
   (a) a detection circuit configured for:
      (i) measuring a measured total horizontal pixels, a measured total vertical scan lines, a measured active horizontal pixels and a measured active vertical scan lines, (ii) estimating an expected total horizontal pixels, an expected total vertical scan lines, an expected active horizontal pixels and an expected active vertical scan lines, (iii) determining whether the magnitude of the difference between the expected total vertical scan lines and the measured total vertical scan lines falls within a first range defined by a first threshold and a second threshold, (iv) determining whether the magnitude of the difference between the expected total horizontal pixels and the measured total horizontal pixels falls within a second range defined by a third threshold and a fourth threshold, (v) determining whether the magnitude of the difference between the expected active horizontal pixels and the measured active horizontal pixels falls within a third range defined by a fifth threshold and a sixth threshold, and (vi) determining whether the magnitude of the difference between the expected active vertical scan lines and measured active vertical scan lines falls within a fourth range defined by a seventh threshold and an eighth threshold;

(b) a vertical synchronization correction circuit configured for correcting the vertical synchronization signal if the magnitude of the difference between the expected total vertical scan lines and the measured total vertical scan lines is within the first range;

(c) a horizontal synchronization correction circuit configured for correcting the horizontal synchronization signal if the magnitude of the difference between the expected total horizontal pixels and the measured total horizontal pixels is within the second range; and (d) a data enable correction circuit configured for correcting the data enable signal if the magnitude of the difference between the expected active vertical scan lines and the measured active vertical scan lines is within the third range or the magnitude of the difference between the expected active horizontal pixels and the measured active horizontal pixels is within the fourth range.

2. The video receiver of claim 1 wherein the detection circuit is further configured for:

(a) transmitting a first enable signal to the vertical synchronization circuit, the enable signal (i) being in a first logic state when the magnitude of the difference between the expected total vertical scan lines and the measured total vertical scan lines is not within the first range, and (ii) being in a second logic state when the magnitude of the difference between the expected total vertical scan lines and measured total vertical scan lines is within the first range;

(b) transmitting a second enable signal to the horizontal synchronization circuit, the enable signal (i) being in a first logic state when the magnitude of the difference between the expected total horizontal pixels and the measured total horizontal pixels is not within the second range, and (ii) being in a second logic state when the magnitude of the difference between the expected total horizontal pixels and the measured total horizontal pixels is within the second range; and (c) transmitting a third enable signal to the data enable circuit, the enable signal (i) being in a first logic state when the magnitude of the difference between the expected active vertical scan lines and the measured active vertical scan lines is not within the third range and the magnitude of the difference between the expected active horizontal pixels and the measured active horizontal pixels is not within the fourth range, and (ii) being in a second logic state when the magnitude of the difference between the expected active vertical scan lines and the measured active vertical scan lines is within the third range or the magnitude of the difference between the expected active horizontal pixels and the measured active horizontal pixels is within the fourth range.

3. The video receiver of claim 2 wherein:

(a) the vertical synchronization circuit is configured for correcting the vertical synchronization signal according to the expected total vertical scan lines when the first enable signal is in the second logic state and for passing through the vertical synchronization signal when the first enable signal is in the first logic state;

(b) the horizontal synchronization circuit is configured for correcting the horizontal synchronization signal according to the expected total horizontal pixels when the second enable signal is in the second logic state and for passing through the horizontal synchronization signal when the second enable signal is in the first logic state (c) the data enable circuit is configured for correcting the data enable signal according to the expected active vertical scan lines and expected active horizontal pixels when the third enable signal is in the second logic state and for passing through the date enable signal when the third enable signal is in the first logic state.

4. The video receiver of claim 1 wherein the first range, the second range, the third range, and the fourth range are equal.

5. The video receiver of claim 1 wherein the first threshold, the second threshold, the third threshold, the fourth threshold, the fifth threshold, the sixth threshold, the seventh threshold and the eighth threshold are set according to the video source type.

6. The video receiver of claim 5 wherein the video source type is the manufacturer of the video source type.

7. The video receiver of claim 1 wherein the detection circuit, the vertical synchronization circuit, the horizontal synchronization circuit and the data enable circuit are implemented as a single field programmable gate array.

8. The video receiver of claim 1 wherein the video receiver is an input card of a video switcher.

9. A method for correcting a video signal comprising the steps of:

(a) receiving a video signal comprising a horizontal synchronization signal, a vertical synchronization signal, and a data enable signal;

(b) measuring a measured total vertical scan lines, a measured total horizontal pixels, a measured active vertical scan lines and a measured active horizontal pixels;

(c) estimating an expected total vertical scan lines, an expected total horizontal pixels, an expected active vertical scan lines and an expected active horizontal pixels;

(d) determining whether the magnitude of the difference between the expected total vertical scan lines and the measured total vertical scan lines falls within a first range defined by a first threshold and a second threshold;

(e) correcting the vertical synchronization signal according to the expected total vertical scan lines if the magnitude of the difference between the expected total vertical scan lines and the measured total vertical scan lines is within the first range;

(f) determining whether the magnitude of the difference between the expected total horizontal pixels and the measured total horizontal pixels falls within a second range defined by a third threshold and a fourth threshold;

(g) correcting the horizontal synchronization signal according to the expected total horizontal pixels if the magnitude of the difference between the expected total horizontal pixels and the actual horizontal pixels is within the second range;

(h) determining whether the magnitude of the difference between the expected active vertical scan lines and the measured active vertical scan lines falls within a third range defined by a fifth threshold and a sixth threshold;

(i) determining whether the magnitude of the difference between the expected active horizontal pixels and measured active horizontal pixels falls within a fourth range defined by a seventh threshold and an eighth threshold;

(j) correcting the data enable signal if the magnitude of the difference between the expected active vertical scan lines and the measured active vertical scan lines is within the third range or the magnitude of the difference between the expected active horizontal pixels and the measured active horizontal pixels is within the fourth range.

10. The method of claim 9 further comprising the step of generating a first enable signal, the first enable signal:
   (a) being in a first logic state when the magnitude of the difference between the expected total vertical scan lines and the measured total vertical scan lines is not within the first range; and
   (b) being in a second logic state when the magnitude of the difference between the expected total vertical scan lines and measured total vertical scan lines is within the first range.

11. The method of claim 9 further comprising the step of generating a second enable signal, the second enable signal:
   (a) being in a first logic state when the magnitude of the difference between the expected total horizontal pixels and the measured total horizontal pixels is not within the second range; and
   (b) being in a second logic state when the magnitude of the difference between the expected total horizontal pixels and measured total horizontal pixels is within the second range.

12. The method of claim 9 further comprising the step of generating a third enable signal, the third enable signal:
   (a) being in a first logic state when the magnitude of the difference between the expected active vertical scan lines and the measured active vertical scan lines is not within the third range and the magnitude of the difference between the expected active horizontal pixels and the measured active horizontal pixels is not within the fourth range; and
   (b) being in a second logic state when the magnitude of the difference between the expected active vertical scan lines and the measured active vertical scan lines is within the third range or the magnitude of the difference between the expected active horizontal pixels and the measured active horizontal pixels is within the fourth range.

13. The method of claim 10 wherein the step of correcting the vertical synchronization signal further comprising the steps of:
   (a) correcting the vertical synchronization signal according to the expected total vertical scan lines if the first enable signal is in a second logic state; and
   (b) passing through the vertical synchronization signal if the first enable signal is in a first logic state.

14. The method of claim 11 wherein the step of correcting the horizontal synchronization signal further comprising the steps of:
   (a) correcting the horizontal synchronization signal according to the expected total horizontal pixels if the second enable signal is in a second logic state; and
   (b) passing through the horizontal synchronization signal if the second enable signal is in a first logic state.

15. The method of claim 12 wherein the step of correcting the data enable signal further comprising the steps of:
   (a) correcting the data enable signal according to the expected active vertical scan lines and expected active horizontal pixels if the third enable signal is in a second logic state; and
   (b) passing through the data enable signal if the third enable signal is in a first logic state.

16. The method of claim 9 further comprising the steps of selecting the first threshold, the second threshold, the third threshold, the fourth threshold, the fifth threshold, the sixth threshold, the seventh threshold and the eighth threshold according to source type.

17. The method of claim 16 further comprising the steps of:
   (a) determining an EDID of a video source of the video signal; and
   (b) selecting the first threshold, the second threshold, the third threshold, the fourth threshold, the fifth threshold, the sixth threshold, the seventh threshold and the eighth threshold according to the EDID of the video source.

* * * * *